United States Patent [19]

Itoh

[11] Patent Number: 4,488,680
[45] Date of Patent: Dec. 18, 1984

[54] THERMALLY RESPONSIVE VALVE DEVICE

[75] Inventor: Kouichi Itoh, Chita, Japan

[73] Assignee: Aisin Seiki Kabushiki Kaisha, Kariya, Japan

[21] Appl. No.: 472,876

[22] Filed: Mar. 8, 1983

[30] Foreign Application Priority Data

Mar. 31, 1982 [JP] Japan .................. 57-45903

[51] Int. Cl.$^3$ .......................... G05D 23/12
[52] U.S. Cl. .................. 236/93 A; 236/34.5; 236/100
[58] Field of Search ............ 236/34.5, 93 A, 100, 236/99 R, 99 J; 137/871; 251/80

[56] References Cited

U.S. PATENT DOCUMENTS

| | | | |
|---|---|---|---|
| 2,396,138 | 3/1946 | Vernet | 236/34 X |
| 2,400,615 | 5/1946 | Warrick et al. | 236/34.5 |
| 2,400,911 | 5/1946 | Booth | 236/34.5 |
| 2,480,676 | 8/1949 | Shaw | 236/34.5 |
| 2,510,473 | 6/1950 | Jensen | 236/34.5 |
| 3,913,831 | 10/1975 | Talak | 236/34.5 |
| 3,927,830 | 12/1975 | Briski | 236/100 |
| 3,929,283 | 12/1975 | Delpla | 236/12 R |
| 4,027,643 | 6/1977 | Feenan et al. | 123/196 AB |
| 4,180,208 | 12/1979 | Obermaier | 236/100 X |
| 4,190,198 | 2/1980 | Casuga et al. | 251/80 X |

*Primary Examiner*—William E. Tapolcai
*Attorney, Agent, or Firm*—Burns, Doane, Swecker and Mathis

[57] ABSTRACT

The present invention relates to a thermally responsive valve device including a body with an inlet port and first and second outlet ports. A spool valve is slidably mounted within the body and includes a valve portion for selectively connecting the inlet port with one of the first and second outlet ports. A temperature responsive element causes the spool valve to move in response to changes in temperature. A valve is provided for controlling fluid communication through the first outlet port. The valve is mounted on the spool valve such that the valve moves with movement of the spool valve until the valve closes the first outlet port and such that subsequent movement of the spool valve is independent of the valve.

14 Claims, 4 Drawing Figures

THERMALLY RESPONSIVE VALVE DEVICE

BACKGROUND OF THE INVENTION

1. Field of the Invention

The present invention relates to thermally responsive valve devices. More particularly, the present invention relates to thermally responsive valve devices having valve members actuated by a thermostat to control fluid communication between a plurality of ports.

2. Prior Art

Various thermally responsive valve devices have been proposed for controlling the flow of oil which is transmitted to an oil cooler for vehicle engines. In this way, the optimum temperature of the oil can be maintained and a high load on the oil cooler can be prevented. One type of thermally responsive valve device is illustrated in FIG. 4.

With reference to FIG. 4, a body 2 of the thermally responsive valve device 1 has an oil inlet port 3 and first and second outlet ports 4 and 5. The inlet port 3 is connected to an oil pump 8 while the first outlet port 4 is directly connected to a vehicle engine E and the second outlet port 5 is connected to an oil cooler C which is connected to the engine E. A spool valve 8 is slidably received within a bore 6 of the body 2 and is biased to the left (as seen in the FIG. 4) by a spring 7. The spool valve 8 is urged to the right (as seen in FIG. 4) by a temperature responsive device or thermostat 9 such as a thermally responsive wax type thermostat.

The spool valve 8 is normally maintained in the illustrated position in which the inlet port 3 is in fluid communication with the first outlet port 4. In response to an increase in temperature, the wax within the thermostat 9 expands to urge the spool valve 8 to move to the right (as seen in FIG. 4) against the biasing force of the spring 7 whereby the fluid communication between the ports 3 and 4 will be correspondingly reduced and the fluid communication between the inlet port 3 and the second outlet port 5 will be correspondingly increased. Thus, at least a portion of the oil is transmitted to the engine E through the cooler C.

In this type of thermally responsive valve device, the oil may leak from the inlet port 3 to the first outlet port 4 through the clearance between the inner surface of the bore 6 and a land portion of the spool valve 8 even when the spool valve 8 is moved completely to the right. The above-described leakage of the oil may increase when the viscosity of the oil is decreased due to high temperature conditions and may also increase when the flow resistance in the oil cooler C increases. Therefore, the desired flow of fluid (oil) through the cooler C may not be obtained.

SUMMARY OF THE INVENTION

Therefore, it is an object of the present invention to provide a new and improved thermally responsive valve device which obviates the above-mentioned drawback of the prior art.

It is another object of the present invention to provide a new and improved thermally responsive valve device wherein leakage of the fluid is minimized.

It is still another object of the present invention to provide a new and improved thermally responsive valve device which is relatively simple in construction and is low in cost.

These and other objects are accomplished by a thermally responsive valve device according to the present invention. The valve device includes a body with an inlet port and first and second outlet ports. A spool valve is slidably mounted within the body and includes a valve portion for selectively connecting the inlet port with one of the first and second outlet ports. A temperature responsive element causes the spool valve to move in response to changes in temperature. A valve is provided for controlling fluid communication through the first outlet port. The valve is mounted on the spool valve such that the valve moves with movement of the spool valve until the valve closes the first outlet port and such that subsequent movement of the spool valve is independent of the valve.

BRIEF DESCRIPTION OF THE DRAWINGS

A preferred embodiment of the present invention will be described in greater detail in the following detailed description with reference to the accompanying drawings, wherein like members bear like reference numerals, and wherein.

DETAILED DESCRIPTION OF THE PREFERRED EMBODIMENT

Figure 1:
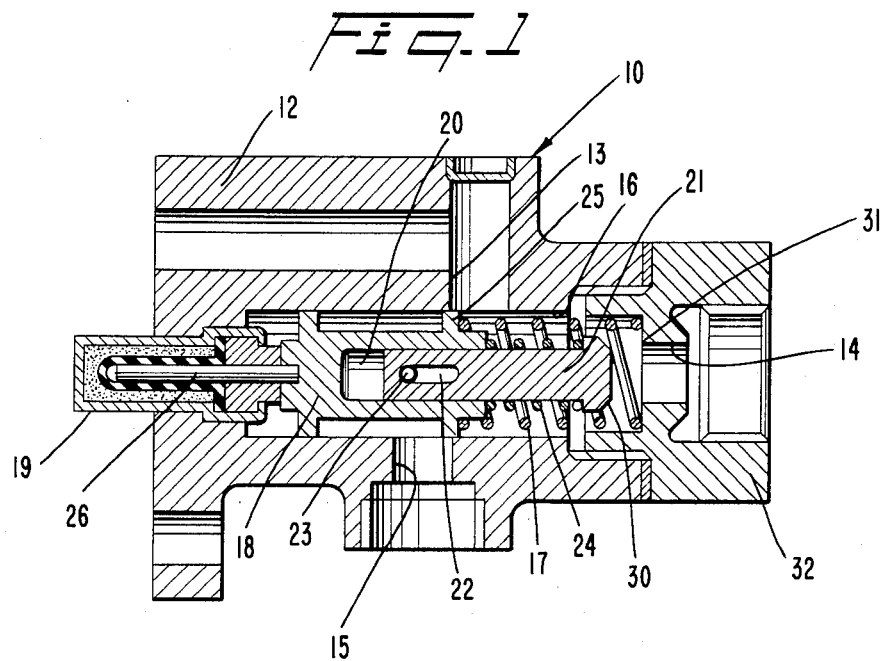
FIG. 1 is a cross-sectional view of a thermally responsive valve device according to the present invention.
Figure 2:
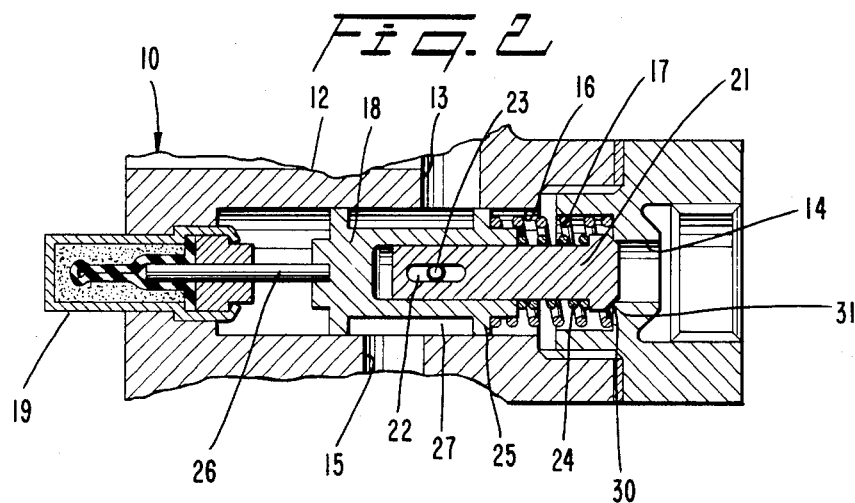
FIG. 2 is a partial cross-sectional view of the valve device of FIG. 1 under different operating conditions.
Figure 3:
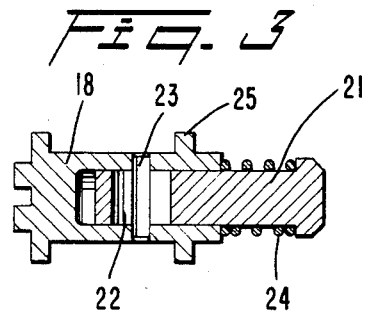
FIG. 3 is a horizontal cross-sectional view of a portion of the valve device of FIG. 1 illustrating the relationship between an elongated hole and a pin which are arranged within the thermally responsive valve device of FIG. 1.
Figure 4:
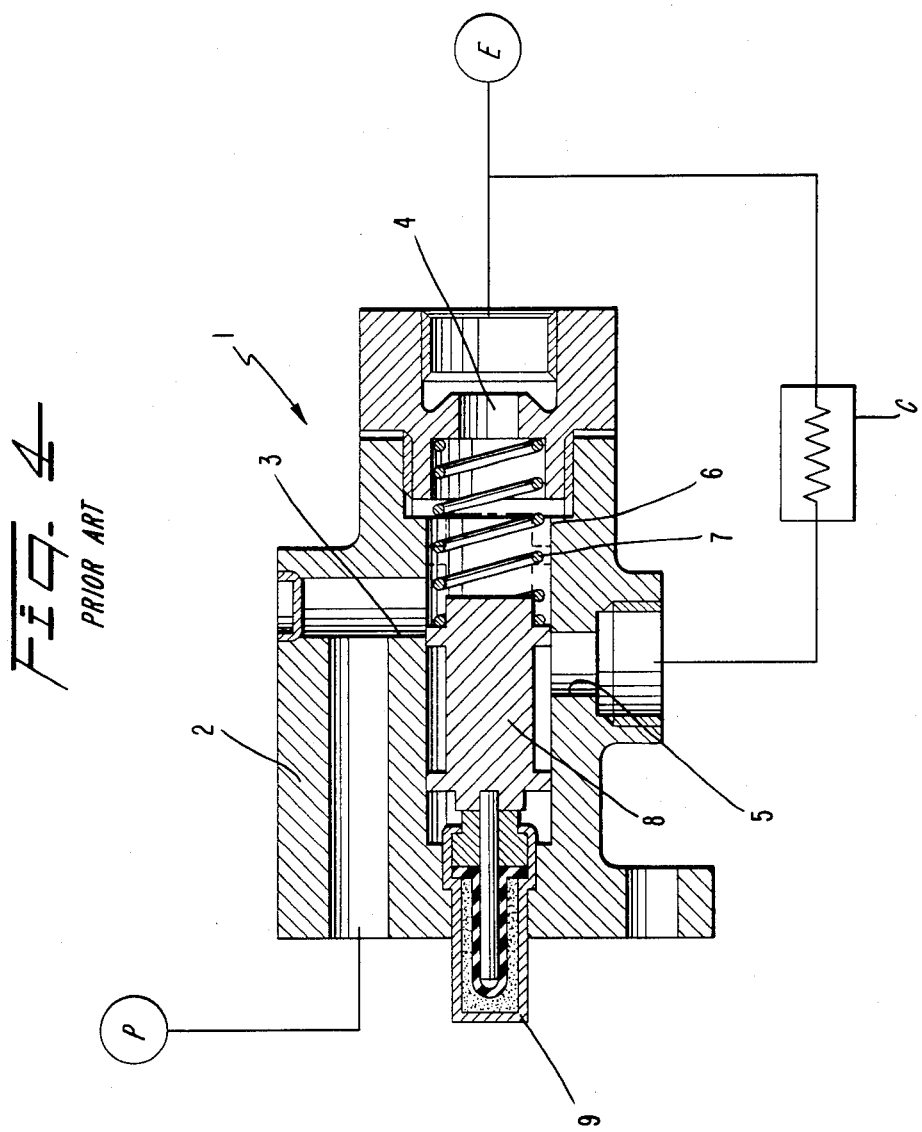
FIG. 4 is a cross-sectional view similar to FIG. 1, illustrating a prior thermally responsive valve device.

Referring to FIGS. 1 through 3, a thermally responsive valve device 10 comprises a body 12 having an inlet port 13. A cover 32 secured to the body 12 has a first outlet port 14 while the body 12 has a second outlet port 15. The inlet port 13 is connected to an oil pump (not shown) while the first outlet port 14 is directly connected to a vehicle engine (not shown). The second outlet port 15 is connected to an inlet of an oil cooler (not shown) whose outlet is connected to the engine.

The body 12 has a bore 16 within which a spool valve 18 is slidably received. The spool valve 18 has an open bore 20 extending axially from one end within which a stem of a poppet valve 21 is slidably received. An axially elongated hole or slot 22 closed at both ends is formed in the stem of the poppet valve 21. A pin member 23 is secured to the spool valve 18 and extends transversely across the bore 20 of the spool valve 18 such that the pin member 23 passes through the elongated hole 22 in the poppet valve stem. In this way, the poppet valve 21 is arranged to move in association with the movement of the spool valve 18 as will be discussed more fully hereinafter.

The poppet valve 21 is axially movable relative to the spool valve 18 by a distance which is equal to the difference between the axial width of the pin member 23 and the axial length of the elongated hole 22. A spring 24 is inserted between an end (to the right in FIGS. 1 and 2) of the spool valve 18 and a head of the poppet valve 21 so that the poppet valve 21 is normally biased to the right as seen in FIG. 1. The poppet valve 21 is prevented from further outward movement relative to the bore 20 in the spool valve 18 by engagement of the pin 23 with an end of the elongated slot 22 in the poppet valve 21. In this extended position, the distance between the right end of the spool valve 18 and the head of the poppet valve 21 is at a maximum.

The head of the poppet valve 21 has a valve portion 30 of conical shape which, upon movement to the right as seen in Fiqs. 1 and 2, is engageable with a valve seat 31 provided on the cover 32 about the first outlet port 14. The spool valve 18 is moved to the right (as seen in FIG. 1) under the influence of a temperature responsive element 19 such as a thermostat of the thermally responsive wax type and is biased to the left by a spring 17.

The spool valve 18 has a groove 27 and a land 25 on an exterior surface of the spool valve 18 which together act as a valve portion such that movement of the spool valve 18 selectively establishes fluid communication between the inlet port 13 and one of the outlet ports 14, 15. A rod 26 is secured to the spool valve 18 to transmit the movement of the thermostat 19 to the spool valve 18.

The operation of the valve device according to the present invention will now be described. When the temperature is low, the thermostat 19 remains in the compacted state (FIG. 1) and therefore the spool valve 18 is maintained in its leftmost position in FIG. 1 by the spring 17. Thus, fluid communication between the inlet port 13 and the second outlet port 15 is prevented by the land 25 which is in contact with the walls of the bore 16. In other words, the land 25 acts as a valve portion. Under these conditions, the poppet valve 21 is urged to the position shown in FIG. 1 by the spring 24 and retained in this position by the pin 23 such that the valve portion 30 of the poppet valve 21 is spaced from the seat 31 about the first outlet port 14. Accordingly, direct fluid communication between the inlet port 13 and the first outlet port 14 is established.

In response to an increase in temperature, the temperature responsive element 19 causes the spool valve 18 to move to the right through the rod 26, e.g., by expansion of the wax of the thermostat 19. As a result, the spool valve 18 moves toward the position illustrated in FIG. 2. During movement toward this position, the inlet port 13 is brought into fluid communication with the second outlet port 15 through the groove 27 on the spool valve 18. In response to the movement of the spool valve 18, the poppet valve 21 moves with the spool 18 to the right by the cooperation of the pin 23, the bore 20 and the spring 24 until the valve portion 30 of the poppet valve 21 is brought into contact with the seat 31 surrounding the first outlet port 14 (FIG. 2). At this time, the land 25 of the spool valve 18 is in contact with the inner surface of the bore 16 at the right side of the inlet port 13. Therefore, direct fluid communication between the inlet port 13 and the outlet port 14 is interrupted by both the land 25 and the valve portion 30 of the poppet valve 21. It should also be noted that any fluid leakage occurring past the land 25 acts directly against the backside of the head of the poppet valve 21 to further urge the valve portion 30 into engagement with the valve seat 31.

After the valve portion 30 of the poppet valve 21 is brought into contact with the seat 31, the spool valve 18 can move further to the right under the influence of the thermostat 19 independently of the poppet valve 21 against the force of the spring 24 since the poppet valve 21 is freely movable to the left along the length of the elongated slot 22 relative to the pin 23 which is fixed to the spool valve 18. Such further movement of the spool valve 18 subjects the poppet valve 21 which is in its closed position to the biasing force of the spring 24 against the seat 31. Further, the poppet valve 21 is not subjected to bending moments upon further movement of the spool valve 18 caused by the thermostat 19.

The principles, preferred embodiment and mode of operation of the present invention have been described in the foregoing specification. However, while a preferred embodiment of the invention has been described, it will be readily apparent to those skilled in the art that various changes and arrangements can be made to accomplish the objects of the present invention without departing from the spirit of the present invention. Accordingly, it is expressly intended that all such changes which fall within the spirit and scope of the present invention as defined in the claims be embraced thereby.

What is claimed is:

1. A thermally responsive valve device comprising:
   a body having an inlet port and first and second outlet ports;
   a spool valve slidaly mounted within said body and having land means fixed thereon, said spool valve being disposable in a first blocking position wherein said land means blocks communication between said inlet port and said second outlet port, and in a second blocking position wherein said land means blocks communication between said inlet port and said first outlet port, said spool valve also having a valve portion for selectively connecting said inlet port to said second outlet port when said land means is out of said first blocking position;
   temperature responsive means operably connected to said spool valve for causing said spool valve to move in response to changes in temperatures;
   valve means for controlling fluid communication through said first outlet port; and
   means for mounting the valve means on said spool valve for movement relative to said spool valve such that said valve means moves with said spool valve as the latter moves toward said second blocking position until said valve means closes said first outlet port and such that subsequent movement of said spool valve is independent of said valve means, said first outlet port being closed by said valve means and by said spool valve when the latter is in said second blocking position.

2. The thermally responsive valve device of claim 1, further comprising a spring for biasing said spool valve against said temperature responsive means.

3. The thermally responsive valve device of claim 1, wherein the means for mounting the valve means includes a spring for biasing the valve means toward said first outlet port.

4. The thermally responsive valve device of claim 1, wherein the means for mounting the valve means includes a closed-ended elongated slot in the valve means, and a pin secured to the spool valve and passing through the slot.

5. The thermally responsive valve device of claim 4, further comprising a spring for biasing the valve means toward said first outlet port.

6. The thermally responsive valve device of claim 1, wherein the valve means comprises a poppet valve having a stem and a head portion having a surface for engaging the first outlet port, said stem being retained by the mounting means within an axial bore in the spool valve.

7. The thermally responsive valve device of claim 6, wherein a side of the head portion opposite the surface for engaging the first outlet port is subjected to the pressure of fluid that bypasses said valve portion of the spool valve when the surface of the head portion of the poppet valve engages the first outlet port.

8. The thermally responsive valve device of claim 6, further comprising a spring arranged between an end of the spool valve and the head portion for further urging the valve portion of the poppet valve against the first outlet port upon the subsequent movement of the spool valve.

9. The thermally responsive valve device of claim 1, wherein one of said spool valve and valve means includes a bore therein which is open at one end to slidably receive the other of said spool valve and valve means and is closed at its opposite end to prevent the flow-through of fluid which leaks between a wall of said bore and said other of said spool valve and valve means.

10. The thermally responsive valve device of claim 9, wherein said bore is formed in said spool valve.

11. The thermally responsive valve device of claim 1, wherein said body includes a bore aligned with said first outlet port, said spool valve being slidable within said bore, said land being engageable with a first portion of a wall of said bore in said first blocking position so as to block said inlet port from said second outlet port, and engageable with another portion of said wall of said bore, when moved out of said first blocking position, to block said inlet port from said first outlet port, said other portion of said wall being located upstream of the site of engagement between said valve means and said inlet port so that any fluid leaking past said land tends to force said valve means against said first outlet port.

12. A thermally responsive valve device comprising:
a body having an inlet port and first and second outlet ports;
a spool valve slidably mounted within said body and having a surface which is disposable in a blocking position for blocking communication between said inlet port and said second outlet port, said spool valve also having a valve portion for selectively connecting said inlet port to said second outlet port when said surface is moved out of said blocking position;
temperature responsive means for causing said spool valve to move in response to changes in temperatures;
valve means for controlling fluid communication through said first outlet port; and
means for mounting the valve means on said spool valve for movement relative thereto, such that said valve means moves with movement of said spool valve until said valve portion of said valve means closes said first outlet port and such that subsequent movement of said spool valve is independent of said valve means, one of said spool valve and valve means including a bore therein which is open at one end to slidably receive the other of said spool valve and valve means and is closed at its opposite end to prevent the flow-through of fluid which may leak between a wall of said bore and said other of said spool valve and valve means.

13. The thermally responsive valve device of claim 12, wherein said bore is formed in said spool valve.

14. A thermally responsive valve device comprising:
a body having an inlet port and first and second outlet ports;
a spool valve slidably mounted within said body and having a valve portion for selectively connecting said inlet port to one of said first and second outlet ports;
temperature responsive means for causing said spool valve to move in response to changes in temperatures;
valve means for controlling fluid communication through said first outlet port; and
means for mounting the valve means on said spool valve such that said valve means moves with movement of said spool valve until said valve portion of said valve means closes said first outlet port and such that subsequent movement of said spool valve is independent of said valve means; the means for mounting the valve means includes a closed-ended elongated slot in the valve means, and a pin secured to the spool valve and passing through the slot.

* * * * *